(12) United States Patent
Zolock et al.

(10) Patent No.: US 8,251,091 B2
(45) Date of Patent: Aug. 28, 2012

(54) TEMPERATURE INSENSITIVE MASS FLOW CONTROLLER

(75) Inventors: Michael J. Zolock, Berthoud, CO (US); Alexei V. Smirnov, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 455 days.

(21) Appl. No.: 12/561,834

(22) Filed: Sep. 17, 2009

(65) Prior Publication Data
US 2011/0061841 A1 Mar. 17, 2011

(51) Int. Cl.
*F16K 31/36* (2006.01)
(52) U.S. Cl. ............... 137/485; 73/202.5; 73/204.12
(58) Field of Classification Search ............ 73/202, 73/202.5, 204.12, 204.13; 137/485–492.5
See application file for complete search history.

(56) References Cited

U.S. PATENT DOCUMENTS

| | | | |
|---|---|---|---|
| 2,594,618 A * | 4/1952 | Booth, Jr. ............ | 73/204.12 |
| 4,245,503 A * | 1/1981 | Hawk et al. ............ | 73/204.12 |
| 4,738,143 A * | 4/1988 | Cage et al. ............ | 73/861.355 |
| 4,947,889 A * | 8/1990 | Ishikawa et al. ............ | 137/486 |
| 5,456,124 A | 10/1995 | Colvin | |
| 6,044,701 A * | 4/2000 | Doyle et al. ............ | 73/202.5 |
| 6,125,695 A * | 10/2000 | Alvesteffer et al. ....... | 73/204.27 |
| 6,269,692 B1 | 8/2001 | Drexel et al. | |
| 6,595,049 B1 * | 7/2003 | Maginnis et al. ............ | 73/202.5 |
| 2003/0115950 A1* | 6/2003 | Ambrosina et al. ........ | 73/202.5 |

FOREIGN PATENT DOCUMENTS

| | | |
|---|---|---|
| WO | 2004003483 A1 | 1/2004 |
| WO | 2004010087 A2 | 1/2004 |

OTHER PUBLICATIONS

Geedipally, Avanthi, "PCT International Search Report and Written Opinion re Application No. PCT/US10/049155", Nov. 29, 2010, Published in: PCT.
Honda, Masashi, "International Preliminary Report on Patentability re application No. PCT/US10/049155", Mar. 29, 2012, p. 6 Published in: CH.

* cited by examiner

*Primary Examiner* — John Rivell
*Assistant Examiner* — R.K. Arundale
(74) *Attorney, Agent, or Firm* — Neugeboren O'Dowd PC; Sean R. O'Dowd

(57) ABSTRACT

A temperature insensitive mass flow controller comprising a main flow line, a capillary tube coupled to the main flow line across a bypass a thermal sensing element coupled to the capillary tube and a mass flow controller housing adapted to at least cover the capillary tube. A first heat sink has been coupled to the mass flow controller internal to the mass flow controller housing and coupled to the capillary tube. The heat sink being adapted to control a temperature of a gas in the capillary tube.

14 Claims, 5 Drawing Sheets

TEMPERATURE INSENSITIVE MASS FLOW CONTROLLER

FIELD OF THE INVENTION

The present invention generally relates to a mass flow controller, or "MFC". In particular, but not by way of limitation, the present invention relates to MFCs with reduced sensitivity to temperature.

BACKGROUND OF THE INVENTION

It may be desired to use a specified gas or a gas mixture in a mass flow controller having a thermal flow sensor. During use of the mass flow controller, these gas or gas mixtures are subjected to a change in temperature in order to properly determine the mass flow rate of the gas or gas mixture through the MFC. The change in temperature of the gas or gas mixture may cause a negative reaction in the gas or gas mixture, thereby causing the gas or gas mixture to provide inaccurate mass flow rate readings.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

So that desired gas and gas mixtures may be used with MFCs having thermal flow sensors without causing undesired reactions of the gas upon increasing the temperature of the gas, one embodiment of the inventions comprises a MFC adapted to control the temperature of the gas flowing through the MFC. One embodiment of a MFC comprises a main flow line having a bypass and a capillary tube coupled to the main flow line across the bypass. A thermal sensing element is coupled to the capillary tube. The MFC also comprises a housing that is adapted to cover the capillary tube. There is a first heat sink internal to the housing in one embodiment that is coupled to the capillary tube, with the first heat sink being adapted to control the temperature of the gas in the capillary tube.

A second embodiment of the invention comprises a method of controlling a temperature of a gas in a mass flow controller capillary tube. One method comprises running a gas through the capillary tube and changing the temperature of the gas using a heat sink internal to a flow sensor housing.

A third embodiment of the invention comprises a heat sink. The heat sink comprises first and second bores adapted to receive a capillary tube and a coupling mechanism adapted to couple the heat sink internal to a mass flow controller housing.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Figure 1:
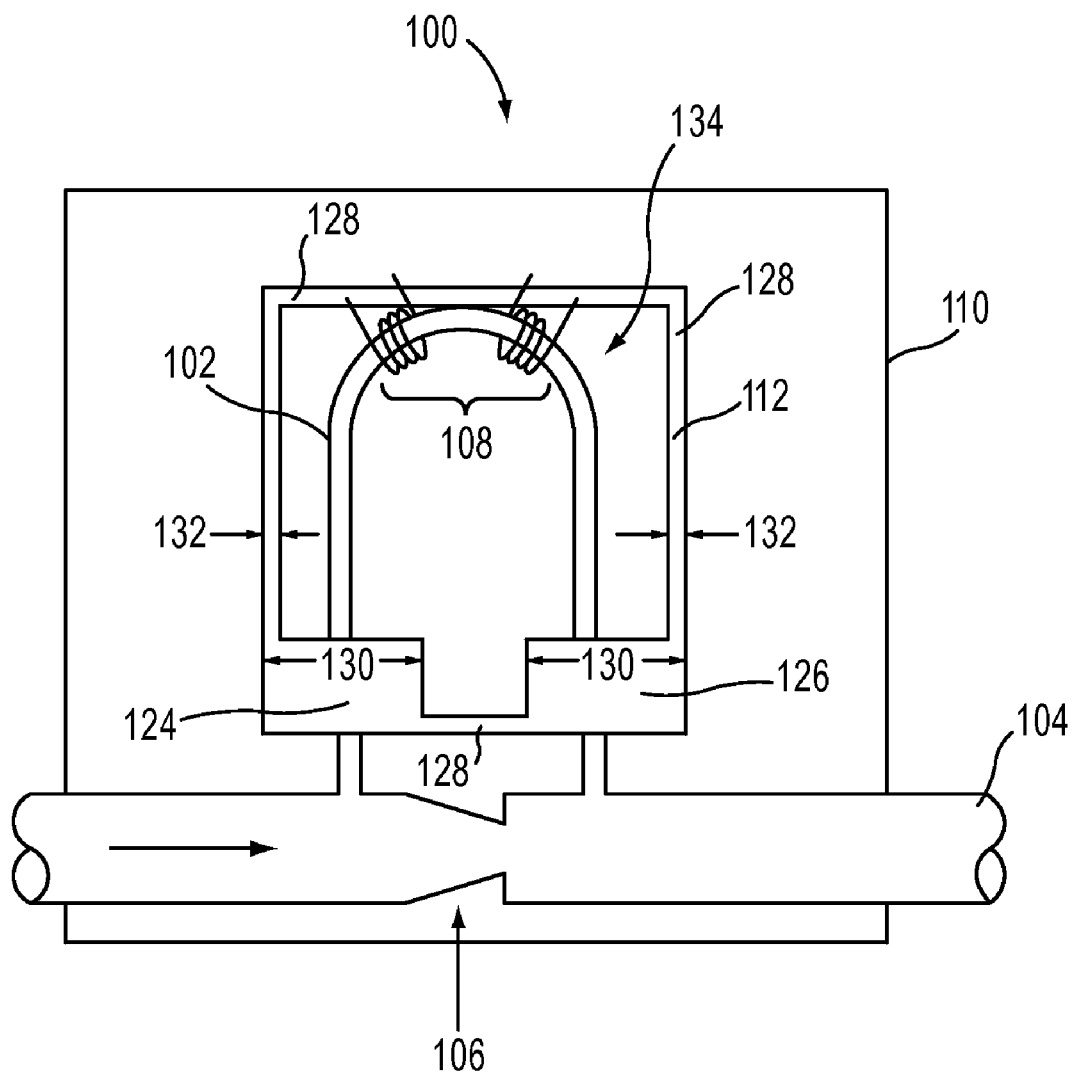
FIG. 1 is a front view of a mass flow controller in accordance with an illustrative embodiment of the invention.

Referring now to the drawings, where like or similar elements are designated with identical reference numerals throughout the several views where appropriate, and referring in particular to FIG. 1, shown is a portion of a mass flow controller 100 adapted to control the temperature of a gas in a capillary tube 102 in order to limit any unwanted reactions of the gas in the capillary tube 102 due to the use of high gas temperatures within the tube 102.

One embodiment of a mass flow controller 100 adapted to control the temperature of a gas comprises a main flow line 104 with the capillary tube 102 coupled to the main flow line 104 across a main flow line bypass 106. A thermal sensing element 108 is coupled to the capillary tube 102. The thermal sensing element 108 may also be referred to as a thermal sensing device. Furthermore, there is a housing 110 adapted to at least cover the capillary tube 102. The housing 110 may also be adapted to cover other portions of the MFC 100 besides the capillary tube 102.

Figure 3:
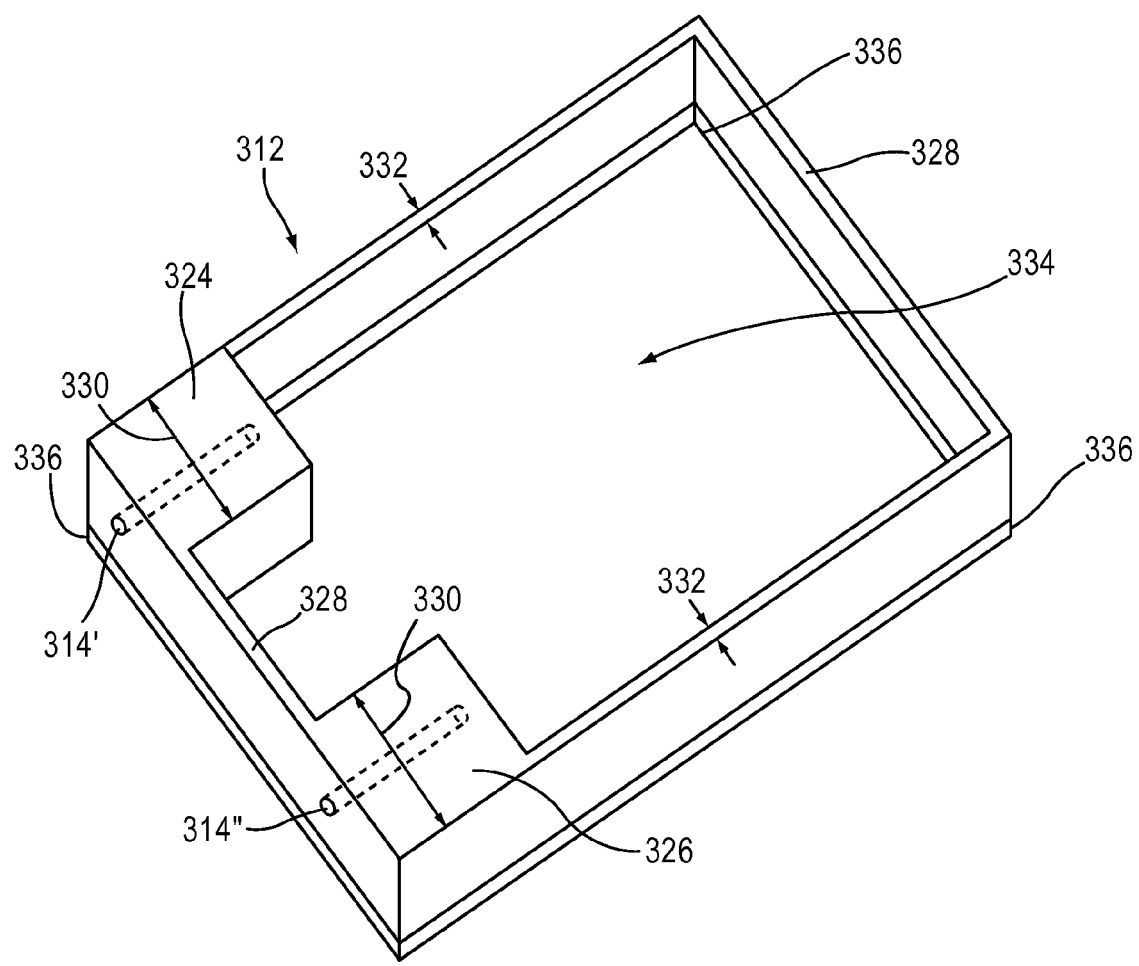
FIG. 3 is an isometric view of a first heat sink in accordance with an illustrative embodiment of the invention.

Included in one embodiment of the MFC 100 is a first heat sink 112, which may be internal to and isolated from the housing 110. Insulation may be placed between the housing 110 and the first heat sink 112. Additionally, the first heat sink 112 may be coupled to the capillary tube 102 such that the first heat sink 112 is adapted to control a temperature of a gas in the capillary tube 102. For example, the capillary tube 102 may couple to the first heat sink 112 through a pair of bores 314', 314", as seen in FIG. 3. A heat-conducting epoxy may be placed between the tube 102 and the first heat sink 112. Through such an application, the temperature of the gas in the capillary tube 102 may decrease as it passes through the bores 314', 314" of the first heat sink 112. For example, in one embodiment, the gas in the main flow line 104 may comprise a temperature substantially equal to the ambient temperature, which may be about 25° C. The first heat sink 112 may comprise a temperature of about 0° C. So, as the gas passes through an inlet bore 314', and the thermal epoxy has been cooled to 0° C., the section of the capillary tube 102 in the bore 314' is also cooled to 0° C. Therefore, the capillary tube 102 cools the gas inside the tube to 0° C. Furthermore, although the term "heat sink" is used for the first heat sink 112, the first heat sink material may actually comprise an insulation material. Materials comprising the first heat sink may include aluminum and stainless steel. However, other materials known in the art are also contemplated.

When the gas reaches the thermal sensing element 108 from the heat sink inlet section 124, the thermal sensing element 108 may heat the temperature of the gas. In many applications, the temperature of the gas is increased by 80° C. by the thermal sensing element 108. Therefore, the temperature of the gas is heated to 80° C. after the first heat sink 112 cools the gas temperature to 0° C. If the first heat sink 112 is not used, and the temperature of the gas is at the ambient temperature of 25° C. prior to the gas being heated by the thermal sensing element 108, the gas is heated 80° C. to about 105° C. So, the use of the first heat sink 112 may lower the temperature of the gas from 105° C. to about 80° C. upon being heated by the thermal sensing element 108. Therefore, gases such as, but not limited to $B_2H_6$, which may have undesired reactions upon being heated to 105° C. may be used in the MFC as they may not have undesired reactions when only being heated to 80° C. In one embodiment, the gas may be cooled again to 0° C. upon exiting the first thermal heat sink outlet section 126.

Figure 2:
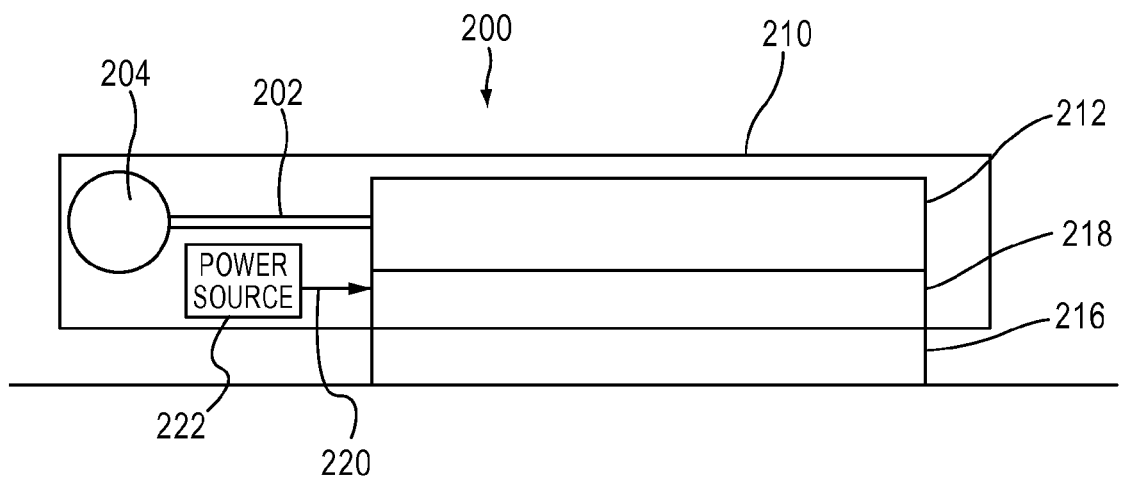
FIG. 2 is a cross-sectional side view of a mass flow controller in accordance with an illustrative embodiment of the invention.

Turning now to FIG. 2, seen is a cross-sectional side view of an embodiment of a MFC 200 having a second heat sink 216 and a thermoelectric cooler 218. In one embodiment, the thermoelectric cooler 218 may be internal to a MFC housing 210 and the second heat sink 216 may be outside the housing 210. However, both the second heat sink 216 and thermoelectric cooler 218 may be internal to the housing 210 or external to the housing 210 in other embodiments.

In one embodiment, the thermoelectric cooler 218 is a device adapted to maintain a temperature through receiving a signal. The signal in one embodiment may be a voltage signal, however other signals are also contemplated. One thermoelectric cooler 218 may be coupled to the second heat sink 216 and the first heat sink 212. Additionally, the thermoelectric cooler 218 may be coupled to the first heat sink 212 and second heat sink 216 in one embodiment through a thermal epoxy. In one embodiment, a temperature of the thermoelectric cooler 218 may be maintained by passing a voltage 220 through the cooler. The voltage 220 may be produced from a power source 222 that is internal to the housing 210. For example, the power source 222 may be included on an additional board in the MFC. In such an embodiment, no changes may need to be made to existing MFC boards and software. The power source 222 may also be included external to the housing 210. Furthermore, the second heat sink 216 in one embodiment may be the base of the MFC. The power source 222 may also be referred to as a power supply.

Returning to FIG. 1, in one embodiment, the first heat sink 102 may also comprise one or more wall sections 128. The inlet and outlet sections 124, 126 may comprise a first thickness 130 and the one or more wall sections may comprise a second thickness 132. The first thickness 130 may be thicker than the second thickness 132 in order for the inlet and outlet sections to provide for an increased contact surface area between the first heat sink 112 and the capillary tube 102 so that the temperature of the gas entering and exiting the capillary tube 102 can be properly controlled. The one or more wall sections 128 are adapted to provide a reference temperature to the thermal sensing element 108. Therefore, the one or more wall sections 128 and inlet and outlet sections 124 and 126 are kept at the substantially the same temperature. For example, insulation may be used to protect the one or more wall sections 128 and/or inlet and outlet sections 124 and 126 from external thermal gradients in order to stabilize the temperature of the first heat sink 112. The shape of the first heat sink 112 seen in FIG. 1 and elsewhere is only exemplary and other configurations and shapes are contemplated.

In one embodiment, the first heat sink 112 also comprises a cavity 134. The cavity 334 may also be seen in FIG. 3. The cavity 134 is created by the surrounding inlet section 124, outlet section 126 and the one or more wall sections 128 and may be adapted to receive the capillary tube 102. The capillary tube 102 may extend from the inlet section 124 to the outlet section 126 in the cavity 124. Furthermore, the cavity may also be adapted to receive the thermal sensing element 108. For example, one thermal sensing element 108 may comprise a pair of coils wrapped around the capillary tube 102. The coils may be adapted to receive a signal such as, but not limited to, a voltage or a current, which induces an increased temperature of the coils. The second coil may also be heated as the gas flows past the second coil, inducing a signal in the second coil. A mass flow rate of fluid may be determined through a measurement of the coil signal(s).

Figure 4:
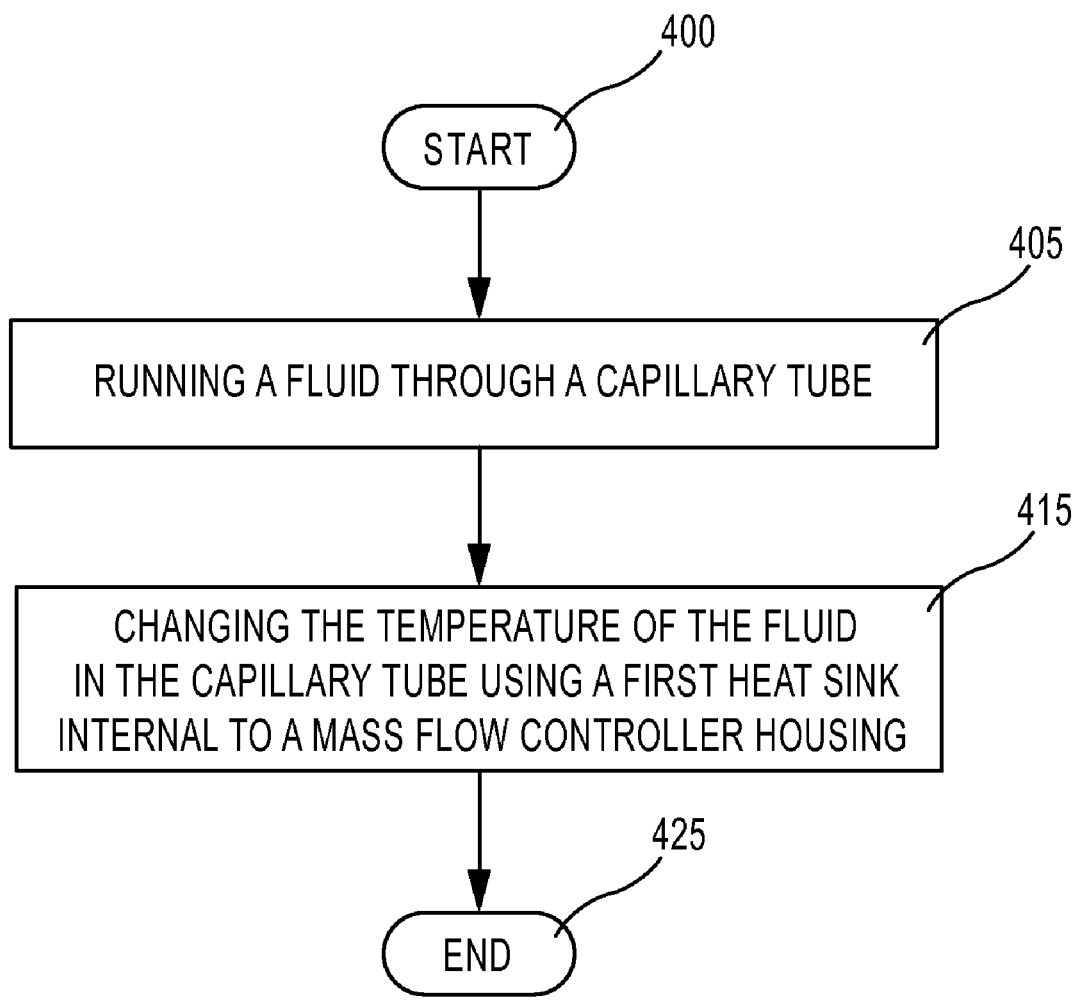
FIG. 4 is a representation of a method in accordance with an illustrative embodiment of the invention.
Figure 5:
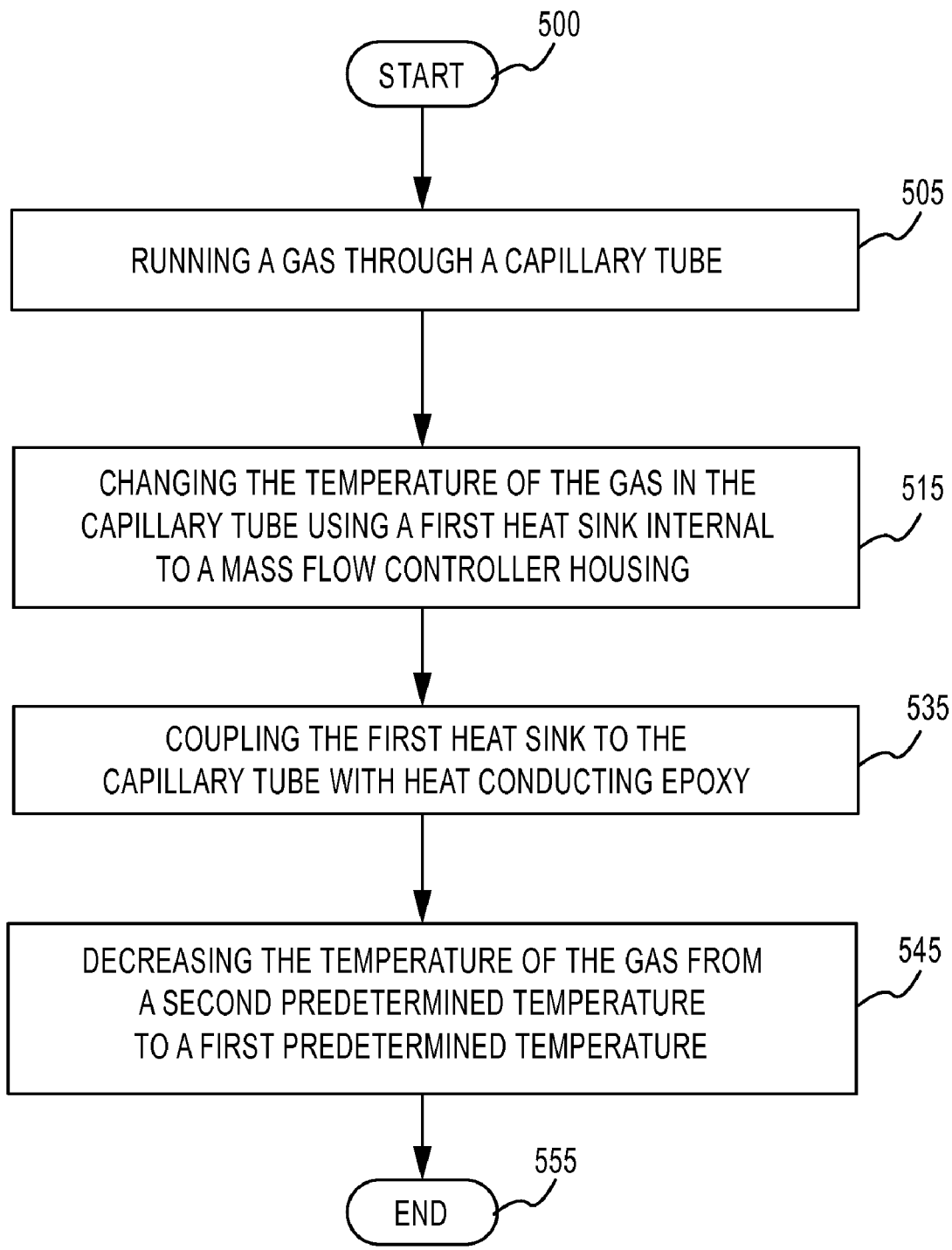
FIG. 5 is a representation of a method in accordance with an illustrative embodiment of the invention.

Turning now to FIG. 4, shown is a method of controlling a temperature of a fluid in a mass flow controller capillary tube. The fluid may be a gas and the capillary tube may be the capillary tube 102 seen in FIG. 1. However, other fluid types, capillary tubes, and MFCs are contemplated. At 400, the method begins and at 405, the method comprises running a fluid through the capillary tube 102. At 415 the method comprises changing the temperature of the gas in the capillary tube 102 using a first heat sink that is internal to a mass flow controller housing. The first heat sink 112 may be the heat sink 112 seen in FIG. 1. As seen in FIG. 5, which is a flowchart depicting another method of controller a temperature of a fluid in a mass flow controller tube, at 535 one method may further include coupling the first heat sink 112 to the capillary tube 102 with heat conducting epoxy and at 545 the method may further include decreasing the temperature of the gas from the second predetermined temperature to the first predetermined temperature. The method of FIG. 4 ends at 425 and the method of FIG. 5 ends at 555, with 505 and 515 similar to the 405 and 415 of FIG. 4.

Changing the temperature of the gas in the capillary tube 102 using a first heat sink 112 that is internal to a mass flow controller housing 110 may comprise maintaining the first heat sink 112 at a first predetermined temperature. For example, it may be desired to maintain the first heat sink 112 at about 0° C. in order for the MFC 100 to operate properly with a specific fluid. In order to maintain the first heat sink 112 at the first predetermined temperature, the first heat sink 112 may be coupled to a thermoelectric cooler. For example, the first heat sink 112 may be coupled to the thermoelectric cooler 218 seen in FIG. 2. In one method, a surface of the thermoelectric cooler 218 and a surface of the first heat sink 212 may be coupled together with a heat conducting epoxy. However, other methods of coupling heat sinks 212 and thermoelectric coolers 218 known in the art are also contemplated.

After coupling the first heat sink 212 to the thermoelectric cooler 218, a current such as, but not limited to the voltage 220 seen in FIG. 2 is then run through the thermoelectric cooler 218 in order to maintain the temperature of the thermoelectric cooler 218 at the predetermined temperature. One type of thermoelectric cooler that may be used for this purpose may be a Peltier module adapted for use with at least 80 mW of power. One such device that may be used is the Thermoelectric Cooler, model no. 1.2-18-F2A, manufactured by Melcor, Corp. of Trenton, N.J.

Additionally, to help maintain the thermoelectric cooler 212 at the predetermined temperature, the thermoelectric cooler 212 may also be coupled to a second heat sink such as, but not limited to the second heat sink 216 seen in FIG. 2, which may be located external to the MFC housing 210. In one variation, the thermoelectric cooler 218 may couple to the second heat sink 216 by coupling a surface of the thermoelectric cooler 218 with an internal surface of the MFC housing 210, and a surface of the second heat sink 216 may be coupled to an external surface of the MFC housing 210 that opposes the thermoelectric cooler 218. But other methods of coupling the thermoelectric cooler 218 to the second heat sink 216 are also contemplated. For example, both the thermoelectric cooler 218 and the second heat sink 216 may be internal to the MFC housing 210; both may be external to the housing 210; one or more may be partially internal to the housing 210; or a portion of the housing 210 may be removed to receive the thermoelectric cooler 218, second heat sink 216, or another portion of the MFC 200.

After maintaining the temperature of the first heat sink 212, changing the temperature of the gas in the capillary tube 202 comprises lowering the gas temperature from an ambient temperature to the first predetermined temperature as the gas crosses a heat sink inlet section such as, but not limited to, the inlet section 124 seen in FIG. 1. For example, as gas enters the capillary tube 102 from the main flow line 104, the temperature of the gas may comprise an ambient temperature, which may be about 25° C. In traveling through the inlet bore 314', as seen in FIG. 3, the gas is exposed to the first predetermined temperature that the inlet section 324 and the rest of the first heat sink 112 is maintained at, which may be 10° C., 0° C., −30° C., or any other desired temperature. The first predetermined temperature may be at least 20° C. below the ambient temperature in one method. Therefore, upon exiting the inlet bore 314', the temperature of the gas in the capillary tube 102 substantially equals the first predetermined temperature.

In one method, changing the temperature of the gas may also include using a thermal sensing element to increase the gas temperature to a second predetermined temperature. For example, the thermal sensing element 108 seen in FIG. 1 may be used. The second predetermined temperature may be about 80° C. above the first predetermined temperature. Upon increasing the gas temperature in the capillary tube 102 to a second predetermined temperature, one method may also include lowering the gas temperature from the second predetermined temperature to the first predetermined temperature as the gas crosses the heat sink outlet section 126. In one method, prior to returning to the main flow line 104, the gas is returned to the first predetermined temperature as the gas travels through the outlet bore 314". One gas may comprise $B_2H_6$, but other gases may be utilized.

In FIG. 3, shown is another embodiment of the invention. The invention comprises a heat sink 312 having first and second bores 314', 314" adapted to receive a capillary tube and a coupling mechanism 336 adapted to couple the heat sink 312 internal to a mass flow controller housing. In one embodiment, the heat sink 312 is adapted to receive the capillary tube 102 seen in FIG. 1. Furthermore, the coupling mechanism 336 seen in FIG. 3 is a heat conducting epoxy. However, other coupling mechanisms such as, but not limited to, a fastening device, are contemplated.

In one heat sink embodiment, the first bore 314' may be included in an inlet section 324 having a first thickness 330 and the second bore 314" may be included in an outlet section 326 also having the first thickness 330. The outlet section 326 and inlet section 324 may be integrated. For example, the outlet and inlet sections 324, 326 may comprise a single block of material and may have an integrated wall section 328 extending between the inlet section and outlet sections 324, 326. The heat sink 312 may also comprise additional wall sections 328 and the wall sections 328 may comprise a second thickness 332. The second thickness may be less thick than the first thickness 330. However, other first and second thicknesses 330, 332 are contemplated. All wall sections 328 and the inlet and outlet sections 324, 326 may be integrated together. However, they may also be separate sections that are coupled together with one or more coupling mechanisms such as a weld or a heat conducting epoxy. The inlet section 324, outlet section 326, and the one or more wall sections 328 are generally adapted to create a cavity 334 adapted to receive the capillary tube 102 and a thermal sensing element 108. The inlet section 324 may be adapted to receive the capillary tube 112 having the gas coming from the main flow line 104 and the outlet section 326 may comprise the outlet bore 314" adapted to receive the capillary tube 112 having the gas exiting to the main flow line 104.

In conclusion, embodiments of the present invention provide, among other things, a temperature insensitive mass flow controller. Those skilled in the art can readily recognize that numerous variations and substitutions may be made in the invention, its use, and its configuration to achieve substantially the same results as achieved by the embodiments described herein. Accordingly, there is no intention to limit the invention to the disclosed illustrative forms. Many variations, modifications, and alternative constructions fall within the scope and spirit of the disclosed invention as expressed in the claims.

What is claimed is:

1. A mass flow controller comprising, a main flow line;
a capillary tube coupled to the main flow line across a bypass;
a thermoelectric cooler thermally coupled to the capillary tube, the thermoelectric cooler is configured to lower a temperature of a gas from an ambient temperature as the gas enters an inlet of the capillary tube;
a thermal sensing element coupled to the capillary tube that is configured to increase the gas temperature to a second temperature; and
a mass flow controller housing adapted to at least cover the capillary tube.

2. The mass flow controller of claim 1 further comprising,
a first heat sink internal to a mass flow controller housing that thermally couples the capillary tube to the thermoelectric cooler;
a second heat sink; and
the thermoelectric cooler is coupled to the second heat sink and the first heat sink.

3. The mass flow controller of claim 2 wherein,
the second heat sink is located externally from the mass flow controller housing; and
the thermoelectric cooler and the second heat sink are adapted to maintain the first heat sink at a first predetermined temperature.

4. The mass flow controller of claim 3 further comprising;
a power supply adapted to supply a current to the thermoelectric cooler; and wherein,
the first heat sink is adapted to be maintained at the first predetermined temperature.

5. The mass flow controller of claim 2 wherein, the first heat sink comprises
a capillary tube inlet section adapted to receive the capillary tube from the main flow line;
a capillary tube outlet section adapted to emit the capillary tube to the main flow line;
one or more first heat sink wall sections; and wherein,
at least one of the inlet and outlet sections have a first thickness, and the one or more wall sections have at least one second thickness.

6. The mass flow controller of claim 5 wherein,
the first heat sink further comprises a cavity surrounded by the inlet section, the outlet section and the one or more first heat sink wall sections; and
the thermal sensing element and at least a portion of the capillary tube extending from the inlet section to the outlet section are adapted to be received by the cavity.

7. The mass flow controller of claim 1 wherein, the thermal sensing element comprises a pair of coils wound around the capillary tube.

8. A method of controlling a temperature of a gas in a mass flow controller capillary tube comprising,
   running a gas through a capillary tube; and
   changing the temperature of the gas in the capillary tube using a first heat sink internal to a housing of the mass flow controller housing;
   wherein, changing the temperature of the gas in the capillary tube comprises,
   maintaining the first heat sink at a first predetermined temperature;
   lowering the gas temperature from an ambient temperature to the first predetermined temperature as the gas crosses a heat sink inlet section; and
   using a thermal sensing element to increase the gas temperature to a second predetermined temperature.

9. The method of claim 8 further including, coupling the first heat sink to the capillary tube with heat conducting epoxy.

10. The method of claim 8 wherein,
   the first predetermined temperature is at least 20° C. below the ambient temperature; and
   the second predetermined temperature is about 80° C. above the first predetermined temperature.

11. The method of claim 8 wherein, maintaining the first heat sink at the first predetermined temperature comprises,
   coupling the first heat sink to a thermoelectric cooler;
   coupling the thermoelectric cooler to a second heat sink; and
   running a current through the thermoelectric cooler.

12. The method of claim 11 wherein, the second heat sink is external to the housing of the mass flow controller.

13. The method of claim 8 further including, decreasing the temperature of the gas from the second predetermined temperature to the first predetermined temperature.

14. The method of claim 8 wherein the gas comprises $B_2H_6$.

* * * * *